March 11, 1941.  E. A. TRAEGER  2,234,420
SYNCHRONOUS ELECTRIC MOTOR
Filed Oct. 29, 1938   2 Sheets-Sheet 1
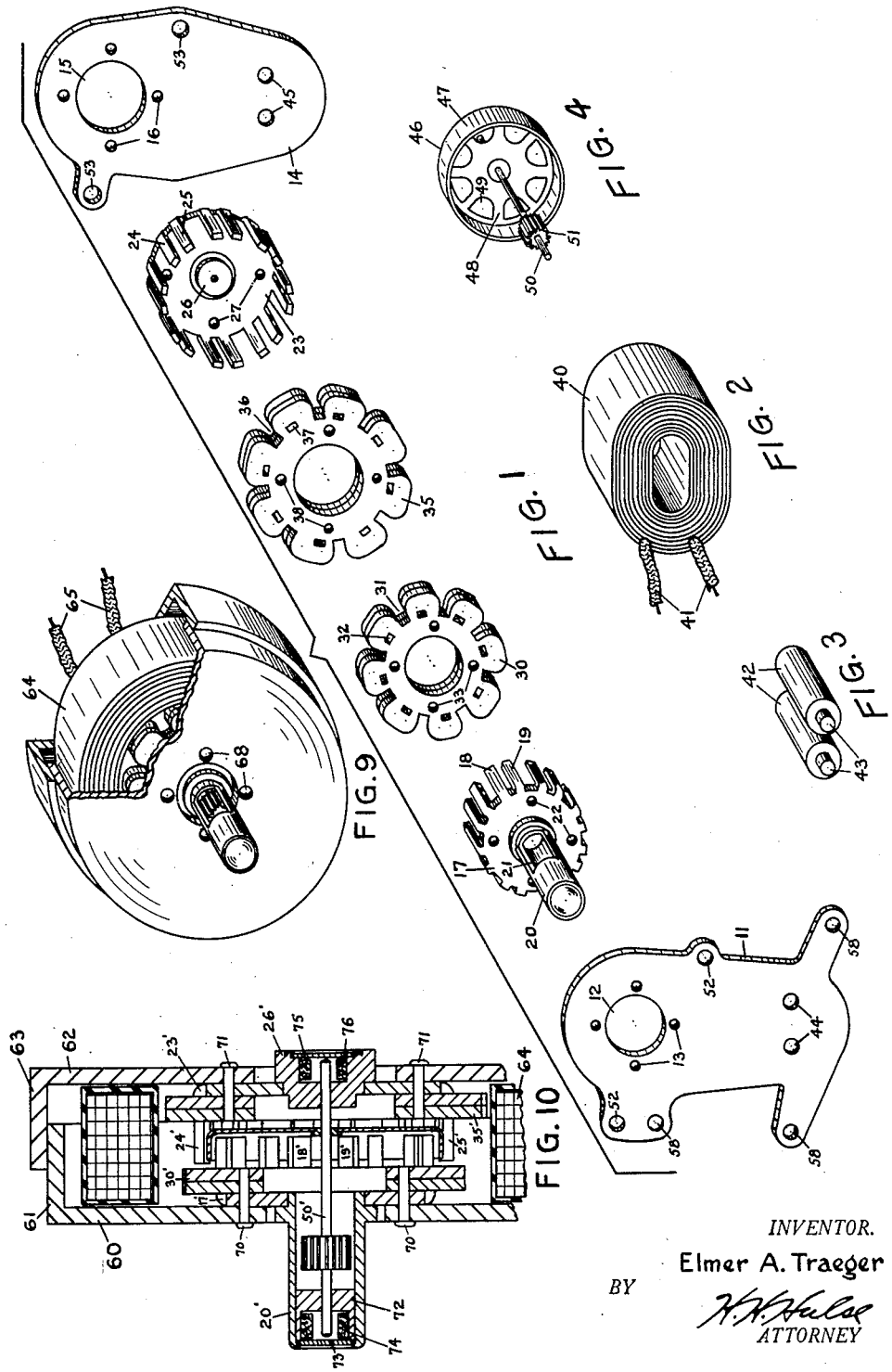
INVENTOR.
Elmer A. Traeger
BY
ATTORNEY March 11, 1941.  E. A. TRAEGER  2,234,420
SYNCHRONOUS ELECTRIC MOTOR
Filed Oct. 29, 1938  2 Sheets-Sheet 2

INVENTOR.
Elmer A. Traeger
BY
ATTORNEY

Patented Mar. 11, 1941

2,234,420

UNITED STATES PATENT OFFICE 2,234,420

SYNCHRONOUS ELECTRIC MOTOR

Elmer A. Traeger, Peru, Ill., assignor to General Time Instruments Corporation, New York, N. Y., a corporation of Delaware Application October 29, 1938, Serial No. 237,621

5 Claims. (Cl. 172—278)

This invention relates to synchronous electric motors and especially to that type of single-phase self-starting motor which may be employed in the operation of electric clocks and other timing devices.

The requisites of such an electric motor are that it be small and of compact and inexpensive construction, that it operate at comparatively low speed, and that despite its size it have a high synchronous torque and a starting torque of the same order of magnitude.

Although my improvements are especially applicable to a motor of the hysteresis type, certain features thereof may be equally well employed in combination with motors of other types.

A preferred embodiment of my invention, as applied to a hysteresis type motor comprises in combination with a cup-shaped rotor of a material having a high hysteresis coefficient, a field structure wherein one group of poles is positioned on one side of the rotor and another group of poles is positioned on the opposite side or inside thereof. This construction enables one to employ more poles in the field than if all the poles were placed on one side of the rotor.

It is desirable to provide as many poles as possible in the field structure in order that the synchronous speed of the motor be as low as possible. Ordinarily this is effected by providing a rotor and pole structure of large diameter, thereby providing a larger peripheral space in which the poles may be positioned. By positioning part of the poles on an opposite side of the rotor, it is obvious that the requisite number of poles may be provided to cooperate with a rotor of considerably smaller diameter. The smaller rotor not only decreases the overall size of the motor, but also permits the use of thinner material for the rotor. The use of thin material gives a higher power output at subsynchronous speeds. The minimum thickness of the rotor is limited by the electrical characteristics of the motor and by the requirements for structural rigidity of the rotor to resist vibration caused by the field, and these limitations are decreased only as the size of the rotor is decreased.

It has been found, furthermore, that improved operating characteristics are obtained if a shaded pole on one side of the rotor overlaps in whole or in part a non-shaded pole of opposite polarity on the opposite side of the rotor. The term "opposite polarity" as used in the preceding sentence and as used with similar context throughout this specification does not mean opposite instantaneous polarity, but merely indicates that the two poles thus compared or contrasted are associated with different frame plates or with opposite sides or ends of the electromagnetic winding.

A further advantage arising from the use of a rotor of small diameter is that it has less inertia and will accelerate to synchronous speed in a shorter time. Furthermore, a lightweight rotor causes less wear on the bearings and on the rotor shaft which, taken in conjunction with the low speed at which my improved motor is adapted to operate, produces a motor with a longer life. In this connection, it is also to be noted that in one embodiment of my invention, the poles positioned within a cup-shaped rotor create a lateral attraction on the rotor sufficient to overcome any tendency on the part of the rotor to shift its lateral position due to endwise play of the rotor shaft in the bearings. This also contributes to the long life of the motor.

Furthermore, the above described pole construction facilitates the manufacture of the motor, for increased tolerances may be employed in the positioning of the poles; if all the poles are on one side of the rotor, the spacing between adjacent poles must be very closely controlled to avoid contact of the much more closely positioned poles and to insure uniform flux distribution.

An object of my invention is to provide an improved synchronous motor.

A further object is to provide an improved field structure for a low speed synchronous motor.

A further object is to provide an improved hysteresis type motor of small size and of inexpensive construction.

A further object is to provide a synchronous motor having a rotor of comparatively small diameter and of thin cross-section.

A further object is to provide for a synchronous motor, a lightweight low speed rotor with low heat and frictional losses.

Other objects, features and advantages will become apparent as the description proceeds.

Figure 1 is an exploded perspective view of a preferred embodiment of my invention, certain elements being omitted for the purpose of clarity.

Figure 2 is a perspective view of the electromagnetic winding for the same.

Figure 3 is a perspective view of the core elements of the same.

Figure 4 is a perspective view of the rotor assembly for the above motor.

Figure 9 is a perspective view of a modification of my invention, a portion of the housing being broken away; and Figure 10 is a sectional elevation of the modification shown in Figure 9, this figure, as well as Figures 5 to 8, inclusive, being on an enlarged scale.

Figure 5:
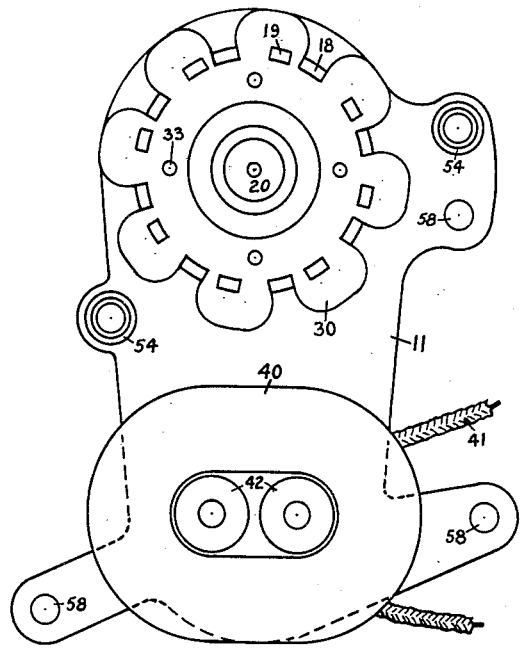
Figure 5 is a front elevation of the motor with the rotor assembly and one of the frame plate assemblies removed.

Referring now to Figure 1, reference numeral 11 represents a frame plate for my motor having a large aperture 12 formed therein and a series of smaller apertures 13. A similar frame plate 14 is also provided with a large aperture 15 and a series of smaller apertures 16 surrounding the larger aperture. A disk 17 with a plurality of polar projections 18 and 19 is provided for association with frame plate 11, the disk and projections being made of a magnetic material of low remanence as are the frame plates 11 and 14. A bearing housing 20 of brass or other suitable non-magnetic material is suitably positioned in a central aperture in the disk 17 and has formed therein a slot or opening 21. Disk 17 is also provided with a series of small apertures 22 which are adapted to register with apertures 13 in the frame plate so that the disk may be fastened to the frame plate and held closely adjacent thereto. A similar disk 23, but of larger diameter than disk 17, is provided for association with frame plate 14, the polar projections 24 and 25 which extend therefrom being adapted to surround the polar projections 18 and 19 of disk 17. A bearing 26 is suitably positioned in a central aperture of disk 23, and a series of smaller apertures 27 are formed in disk 23 to afford means by which this disk may be held closely adjacent the face of frame plate 14.

Shading means 30 which comprise one or more non-magnetic conducting members, which could be said to be generally ring-like in shape, are provided for association with the polar projections 18 and 19, the shading member having a series of slots 31 formed in the outer periphery thereof in which lie polar projections 18 and also having formed therein, between adjacent slots, a series of apertures 32 through which are adapted to extend the polar projections 19. As the shading means, from the viewpoint of fabrication, is preferably a laminated structure, I have here shown two such ring-like members, the same reference numerals applying to each of the two as the structure and the function of the two is substantially identical. A series of small apertures 33 are also formed in shading member 30 which are adapted to register with apertures 13 and 22 so that studs or rivets may extend through the frame plate 11, disk 17 and shading member 30 to hold the several members of the assembly in intimate contact with each other.

Figure 6:
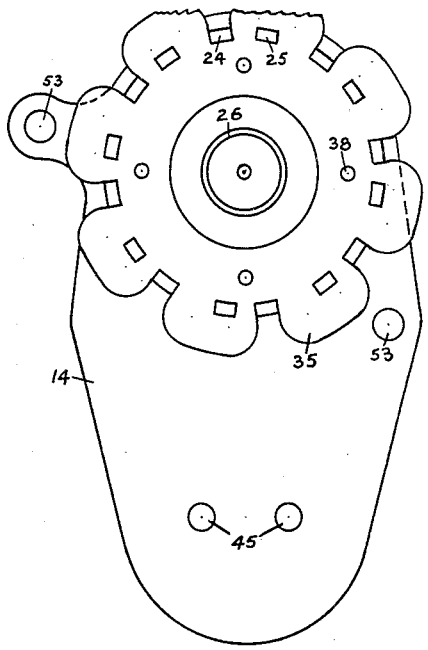
Figure 6 is a rear elevation of the frame plate assembly which has been removed from the above figure.

A similar shading member 35 is provided for polar projections 24 and 25, having slots 36 formed in the periphery thereof to accommodate polar projections 24, and apertures 37 through which poles 25 may extend, a series of small apertures 38 being also formed therein to register with the apertures 16 and 27 so that the frame plate 14, disk 23 and shading member 35 may be held together to form a single unit as is illustrated in Figure 6.

The electromagnetic winding 40 shown in Figure 2 comprises an insulated coil of wire with the conductors 41 extending therefrom according to the usual practice. The core for coil 40 is shown in Figure 3 and consists of two cylindrical members 42, one end of each being somewhat reduced in diameter to form pins 43 which are adapted to be inserted in two apertures 44 in frame plate 11 and be expanded at the ends to securely associate the cores 42 with the frame plate. The opposite end of the cores may be drilled and tapped so that studs 57 extending through apertures 45 in frame plate 14 will draw the latter frame plate into close association with the core pieces.

A cup-shaped rotor 46 is provided as shown in Figure 4 which is preferably formed from a single piece of magnetic material having a high hysteresis coefficient, such as hardened steel. It will be seen that the cup-shaped rotor comprises a flange 47 struck up from a disk-shaped member 48 which has apertures 49 formed therein, the rotor being rigidly affixed to a rotor shaft 50 near one end of which is positioned a pinion 51.

Figure 7:
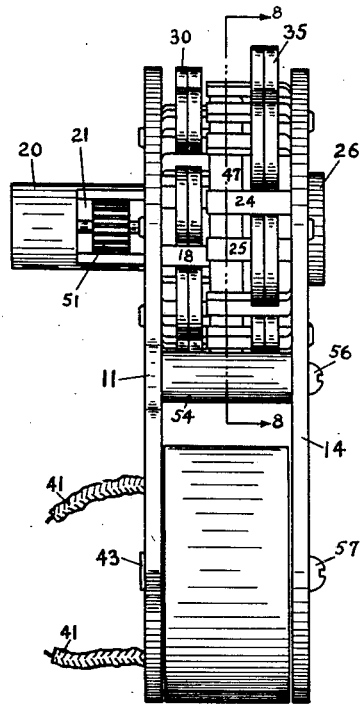
Figure 7 is a side elevation of the completely assembled motor.

A fully assembled motor is shown in Figure 7, the frame plate assembly being held together by suitable pillars 54 according to the usual practice, apertures 52 and 53 being provided in frame plates 11 and 14, respectively, for cooperation with the pillars or with suitable studs 56 which may extend through the frame plates and into the pillar according to the usual construction. Apertures 58 are also provided in frame plate 11 to provide means for mounting the fully assembled motor.

A modification of my invention is shown in Figures 9 and 10 wherein the novel features are incorporated into a so-called doughnut type motor. A field casing 60 of circular shape and having a flange 61 cooperates with a similar field casing 62 having flange 63, the latter field casing member being of slightly larger diameter than the former so that flange 63 may fit closely over flange 61 to form a completely enclosed housing for the motor. Field casings 60 and 62 correspond in function to the frame plates 11 and 14 shown in the first described embodiment, the disk 17' together with its projections 18' and 19', and shading member 30' being associated with the housing 60 by means of suitable studs or rivets 70 extending through apertures 68 in housing 60 in the same manner that the similar elements are associated with the frame plate 11 in the first described embodiment. Those elements in Figures 9 and 10 which are substantially identical in structure and function to the corresponding elements in the preceding figures are here indicated by the same reference numeral primed. Similarly disk 23' together with its polar projections 24' and 25', and shading means 35' are associated with field casing 62 to form a unitary assembly, the suitable studs or rivets 71 extending through apertures in housing 62, and through corresponding apertures in the disc 23' and shading member 35' to hold the assembly together.

The bearing housing 20' has inserted within it, in a position near one end thereof, a bearing 72 made of suitable non-magnetic bearing material with which rotor shaft 50' cooperates. Steel disk 73 is positioned at the extreme end of the bearing housing to take up any lateral thrust of the rotor shaft, and an oiled felt ring 74 is positioned between the bearing and the steel disk to afford lubrication for the rotor shaft. Bearing 26', which is positioned in disk 23', has a similar steel disk 75 with an oiled felt washer 76 to perform the same function with respect to the opposite end of the bearing shaft. It will be noted that the bearing housing and the bearings 72 and 26' are made of non-magnetic material, the purpose being to prevent any magnetic flux from passing through the bearings into the rotor shaft which would heat the shaft. An electromagnetic winding in the form of a doughnut-shaped coil 64 is positioned within the field casing members 60 and 62 and surrounding the pole structure. Suitable conductors 65 extend from the coil through apertures provided in field casing 62 and may be connected with a suitable source of alternating current.

With regard to the operation of the first described motor, energization of coil 40 will cause a magnetic flux to be established from polar projections 18 and 19 through disc 17, frame plate 11, cores 42, frame plate 14, disc 23 to polar projections 24 and 25. As the coil is energized by alternating current, the flux will be reversed with every half cycle of the current, but the polar projections 18 and 24 will always be of opposite instantaneous polarity. Polar projections 19 and 25 will also be of opposite instantaneous polarity, but due to the shading members 30 and 35, respectively, which surround only poles 19 and 25, the instant of maximum flux density of the shaded poles will be displaced or will lag behind that of the unshaded poles.

Figure 8:
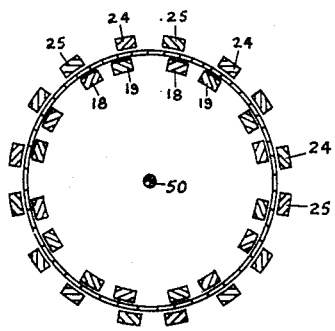
Figure 8 is a sectional view along line 8—8 of Figure 7, only those parts of the poles and the rotor being shown which are intersected by the section plane.

Referring to Figure 8, which illustrates the relative positioning of the poles, it will be seen that the following poles will arrive at a maximum flux density of a given polarity in the order given; poles 25, 18, 19, 24, etc. This causes the field to rotate in a clockwise direction. Poles 18 and 19 are on the opposite side of the rotor from poles 24 and 25, poles 18 and 25 being substantially opposite each other, and poles 19 and 24 being also substantially opposite each other, that pole of each opposing pair which lags the other being slightly offset in the clockwise direction, or in the direction in which the field rotates. It is not essential that all poles associated with one frame plate, or with one side of the winding be on the same side of the rotor and opposite to all the poles associated with the other frame plate, as the preferred construction is concerned only with the positioning of a non-shaded pole opposite a shaded pole of opposite polarity and somewhat offset therefrom. Consequently, other arrangements are possible; for instance, all the shaded poles may be placed within the rotor, and all non-shaded poles on the outside thereof. The arrangement shown in Figure 8 is preferred, however, from the standpoint of low cost production. It will further be noted that the sum of the airgaps between two opposite poles and the rotor is less than the airgap between any two adjacent poles. Consequently, the flux path is through the rotor rather than across the air gap between two adjacent poles.

As an example of the dimensions of the air gaps which I have found in operation to be satisfactory, the distance between poles 18 and 19 and between poles 24 and 25 may be in each instance .055 inch. The distance between the poles and the rotor may approximate in each instance .010 inch.

If, at a given instant, pole 18 is assumed to be north, pole 24 at the same instant will be south, and somewhat later, during the same half cycle pole 19 will be north and pole 25 will be south. At a point in the rotor opposite to pole 18, when it is north, a south pole will be induced which, due to the high hysteresis coefficient of the rotor, will tend to resist reversal of polarity during the period in which pole 25 builds up to its maximum flux density. Consequently, the induced south pole being offset from pole 25 in the direction in which the field rotates will be repelled by pole 25 and create a torque in that same direction, which is sufficient to start the rotor, or to accelerate it when it is rotating at any speed less than synchronous speed. During the remaining portion of the half cycle, the point of maximum flux intensity, north polarity, will shift from pole 19 to pole 24 in a clockwise direction, attracting the south pole previously induced in the rotor by pole 18 to create a torque in the same direction as that in which the field rotates. If the rotor is rotating at synchronous speed the induced south pole in the rotor which was opposite pole 18 when it was north, will be opposite pole 24 a half cycle later, that is when pole 24 is north.

By making the rotor, and in particular, flange portion 47, of thin material, the power output of the motor at sub-synchronous speeds is increased. As an example, I have found that a rotor thickness of approximately .015 inch is quite satisfactory.

The operation of the modification illustrated in Figures 9 and 10 is substantially the same as that of the first described motor, the principal difference being that improved operating characteristics are often obtained with a motor of the doughnut type. The symmetrical positioning of the field with respect to the poles in this type motor results in a more uniform density in the several poles and in less variation in phase displacement between the several shaded poles. Furthermore, the fully enclosed motor and the compact construction are preferred in some uses of the motor.

Although the above described embodiment of my invention because of its operating characteristics, compact construction, and low operating speed is particularly well suited for clock use, I do not limit my invention to clock motors and although the several novel features have been described in combination with each other and with a particular type of motor, it is understood that various subcombinations of the features or elements and their combinations with other types of motors, and modifications and changes in the construction and in the size, shape and proportions of the parts herein described may be effected without departing from the scope of my invention as defined in the following claims.

I claim:

1. A hysteresis type motor comprising an electromagnetic winding, a core therefor, pole plates associated with said core at either end thereof, a cup-shaped rotor of which the flange has a high hysteresis coefficient, said rotor being positioned between said pole plates, a plurality of polar projections extending from one of said pole plates into said cup, said projections being positioned concentrically with respect to and adjacent said flange, a plurality of polar projections extending from the other of said pole plates around the periphery of said cup, said latter projections being positioned concentrically with respect to and adjacent said flange, shading means for alternate projections of each group of said polar projections, the positioning of said groups being such that each non-shaded polar projection of either group is partially overlapped by a shaded polar projection of the opposite group.

2. A self-starting hysteresis motor comprising an electromagnetic winding, pole plates associated with said winding and extending in substantially parallel planes, a disc having pole pieces extending at right angles from the plane thereof affixed to each of said pole plates, one of said discs being of smaller diameter than the other, a rotor having an integral peripheral flange, said flange being concentric with said pole pieces extending from each of said discs, surrounding said pole pieces extending from said disc of smaller diameter and being surrounded by said pole pieces extending from said other disc, and shading means for some of the pole pieces extending from each disc, each shaded pole on the inside and outside, respectively, of said flange being positioned opposite a non-shaded pole of opposite polarity on the outside and inside of said flange, respectively, said shaded poles being circumferentially offset from said non-shaded poles to an extent less than the width of said poles.

3. A synchronous motor comprising an electromagnetic winding, a core therefor, pole plates associated with said core at either end thereof and extending away from said winding in substantially parallel planes, a disc having pole pieces extending therefrom affixed to each of said pole plates, one of said discs being of smaller diameter than the other, a bearing positioned in the center of each disc and extending through said disc and through said associated pole plate, a rotor shaft journaled in each of said bearings, a cup-shaped rotor having a high hysteresis coefficient affixed to said shaft, said rotor being concentric with said pole pieces extending from each of said discs, surrounding said pole pieces extending from said disc of smaller diameter and being surrounded by said pole pieces extending from said other disc, and shading means for some of the pole pieces extending from each disc, each shaded pole on the inside and outside of said rotor being positioned opposite a non-shaded pole of opposite polarity on the outside and inside of said rotor, respectively, said shaded poles being circumferentially offset from said non-shaded poles to an extent less than the width of said poles, said core, said pole plates, said discs and said pole pieces being formed of magnetic material, and said bearings and said shading means being formed of non-magnetic material.

4. A synchronous motor comprising a housing having two substantially parallel opposite interior surfaces, a series of poles extending inwardly from one of said surfaces and lying in substantially a cylindrical surface, a second series of poles extending inwardly from the other of said surfaces and surrounding said first series, shading means for alternate poles of each of said series of poles, an energizing coil positioned within saisd housing and surrounding said second series of poles, and a rotor for cooperation with said poles having a circumferential flange which extends between said first series and said second series of poles.

5. A synchronous motor comprising an electromagnetic winding, pole plates associated with said winding and extending in substantially parallel planes, a disk having pole pieces extending at right angles from the plane thereof affixed to each of said pole plates, the poles of each disk being symmetrically spaced about the axis thereof and lying in a substantially cylindrical surface, one of said disks being of smaller diameter than the other and the two sets of pole pieces being telescoped one within the other, a cup-shaped rotor mounted in axial alignment with said disks and lying in a plane between the two disks, said rotor having an integral peripheral flange extending between the two sets of pole pieces, and shading means for alternate pole pieces of each of said sets.

ELMER A. TRAEGER.